United States Patent [19]
Green

[11] Patent Number: 5,922,237
[45] Date of Patent: Jul. 13, 1999

[54] MOLD VENTS

[75] Inventor: Thomas Benjamin Green, Birmingham, United Kingdom

[73] Assignee: Dunlop Tyres Ltd., Birmingham, United Kingdom

[21] Appl. No.: 08/966,712

[22] Filed: Nov. 10, 1997

[30] Foreign Application Priority Data

Nov. 15, 1996 [GB] United Kingdom .................. 9623770

[51] Int. Cl.⁶ ................................................. B29C 33/10
[52] U.S. Cl. ......................... 249/141; 425/28.1; 425/812
[58] Field of Search ......................... 249/141; 425/28.1, 425/812

[56] References Cited

U.S. PATENT DOCUMENTS

| | | |
|---|---|---|
| 2,290,510 | 7/1942 | Talalay . |
| 2,865,052 | 12/1958 | Wilcox . |
| 3,230,590 | 1/1966 | Schaible et al. ........................ 425/812 |
| 3,377,662 | 4/1968 | Fukushima .............................. 425/28.1 |
| 4,347,212 | 8/1982 | Carter . |
| 4,351,789 | 9/1982 | Sidles et al. . |
| 4,492,554 | 1/1985 | Carter . |
| 4,708,609 | 11/1987 | Yoda et al. .............................. 249/141 |

FOREIGN PATENT DOCUMENTS

| | | |
|---|---|---|
| 0311550 | 4/1989 | European Pat. Off. . |
| 2302906 | 7/1974 | Germany . |
| 0922788 | 4/1963 | United Kingdom . |

OTHER PUBLICATIONS

*Patent Abstracts of Japan*, vol. 009, No. 164 (M–395), Jul. 10, 1985 & JP 60 040218 (Mar. 02, 1985).

*Primary Examiner*—James P. Mackey

[57] ABSTRACT

A vent for a mold comprising a valve closure member and integrally formed spring opening mechanism for opening the valve closure member such that when mounted in an air release vent the valve closure member may open or close said vent.

30 Claims, 4 Drawing Sheets

MOLD VENTS

FIELD OF THE INVENTION

The present invention relates to vents for molds used in forming vulcanisable rubber or other such moldable materials, and particularly, but not exclusively, to vents for tire molds.

DESCRIPTION OF RELATED ART

In the molding of rubber articles such as tires, the initial heating of the tire surface in contact with the hot mold reduces the viscosity of the surface rubber so that under the influence of internal molding pressure local rubber flow occurs. Venting is required to allow pockets of air which may become trapped between the green tire carcass and the hot mold surface to escape, so that every part of the curing tire surface contacts the mold and the tire is thus vulcanised with a perfect impression of the mold detail.

Tire mold vents commonly take the form of small diameter holes drilled through the mold wall normal to the interior surface. Most commonly modern venting utilizes so-called 'insert vents' which are small bore tubes introduced through the mold wall. Once any trapped air has vented through the hole rubber begins to flow through the vent. However, the small diameter of the hole ensures that the rubber therein cures rapidly, thus plugging the vent hole and sealing the mold. After completion of the tire curing process these plugs of rubber, which are still attached to the tire surface, are pulled out of the vent holes when the tire is demolded.

Such plugs of rubber or, 'spue-pips' as they are commonly known, detract from the visual appeal of the molded tire and are usually removed by trimming. This trimming operation is time consuming and thus adds to the cost of producing the tire.

Also, a problem may occur when a cured spue-pip breaks off when the tire is being demolded and thus blocks the vent hole. Such a blocked vent may not be immediately apparent and can cause subsequent poor quality moldings because trapped air cannot be vented.

To solve the above-mentioned problems so-called "spueless vents" have been proposed, which allow trapped air to escape but which close to prevent rubber flow.

U.S. Pat. No. 4,492,554 and U.S. Pat. No. 4,347,212 disclose examples of such 'spueless' vents. These known vents comprise a valve held normally open by a coil spring to allow the passage of air. The valve is closed by flowing rubber which moves a valve head portion against the spring tension into seated engagement with a valve seat. However these vents comprise an assembly of at least four separate components and are thus relatively complicated and expensive and as such have not found wide utility.

SUMMARY OF THE PRESENT INVENTION

Accordingly it is an object of the present invention to provide a spueless vent which is simple in construction and therefore less expensive.

According to the present invention, a vent for a mold comprises a valve closure member and an integrally formed spring opening mechanism for opening the valve closure member.

The vent may also comprise a vent main body which may be formed integrally with the valve closure member and spring opening mechanism. The vent is preferably formed of a moldable plastic material.

BRIEF DESCRIPTION OF THE DRAWINGS

Further aspects of the present invention will become apparent from the following description of embodiments of the invention in conjunction with the following schematic drawings in which:

FIGS. 1A and 1B, respectively, illustrate plan and sectional side elevation views of an insert vent according to the present invention which is formed from a glass reinforced polyphenylene sulphide material.

Figure 1A:
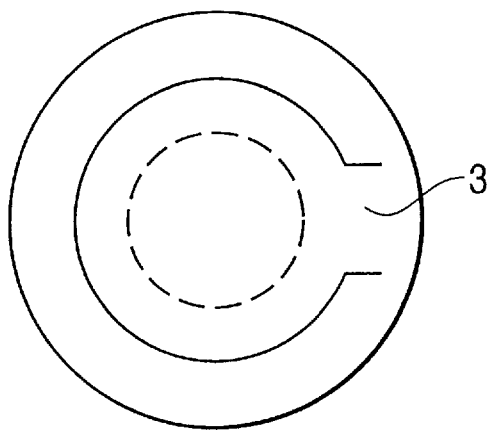
FIGS. 1A–1C show an insert vent according to the invention.

The vent comprises a hollow right cylindrical main body 2 having an upper end face 4 which is fit flush with the interior surface of the mold and a hole 7 formed through the centre of the main body 2 and connecting the upper end face 4 and the bottom end face 8 so as to provide a pathway from the interior of the mold to atmosphere. Disposed at the upper end face 4 is a valve closure member 1, shown in an open position in FIG. 1B, which is generally a short truncated conical shape having a conical valve closure surface 5 which is a complementary profile to a conical valve seating surface 6 formed on the interior surface of the upper end face 4. Thus in the closed position, shown in FIGS. 1A and 1C, the conical valve closure surface 5 of the closure member 1 fits conformingly manner with the valve seating surface 6 of the vent main body 2 to provide a seal.

Figure 1B:
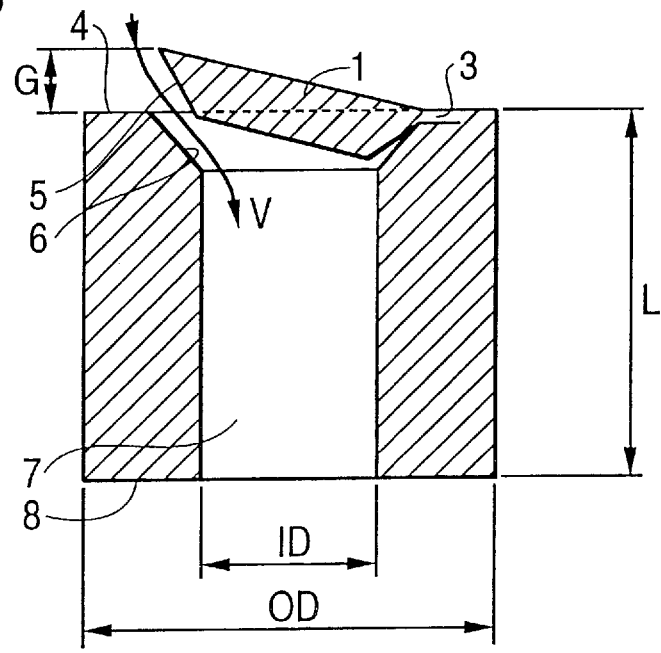
Figure 1C:
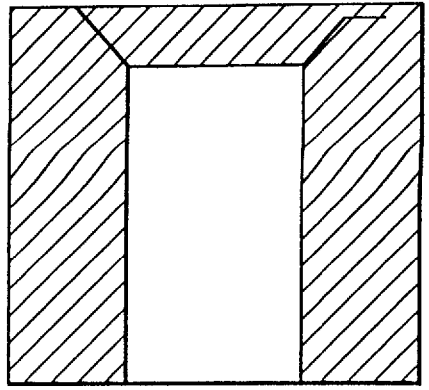

The valve closure member 1 is formed integrally with the vent main body 2 via a region formed as a spring hinge 3 formed on the upper end face 4. The hinge 3 by the molded shape provides a spring mechanism for holding the valve closure member in the normally open position, as shown in FIG. 1B. In this open position the vent allows air trapped in the mold to escape via the central hole 7 of the vent to atmosphere as indicated by arrow V in FIG. 1B. After the trapped air has escaped, the rubber of the tire being expanded into the mold impinges on the valve closure member 1 and forces the valve closure surface 5 into seating engagement with the valve seating surface 6, against the spring tension of the hinge 3. Thus, as shown in FIG. 1C the vent is sealed against the flow of rubber out of the mold. On completion of the molding curing operation, the tire is removed from the mold at which time the valve closure member 1 is moved out of engagement with the valve seating surface 6 by the resilience of spring hinge 3. Therefore, the vent is opened and ready for the next molding operation.

With regard to size, in this embodiment the outside diameter OD of the cylindrical main body 2 of the vent is 3 mm and its length L is 10 mm. The diameter ID of the cylindrical interior passage 7 is 0.75 mm and the gap G of the maximum separation of the closure member 1 and the upper end face 4 is 0.5 mm.

The great advantage of the above-described vent is that it may be molded in a single operation and thus is relatively simple and inexpensive to manufacture.

Apart from plastic the vent may be formed from any suitable engineering material having the necessary mechanical properties and stability over the required working temperature range of up to 200° C. The necessary spring force provided by the spring hinge is obtained by the combination of elasticity of the material and design dimensions. Suitable materials include metals and engineering plastics such as thermoplastic and thermosetting materials including filled materials.

Figure 3:
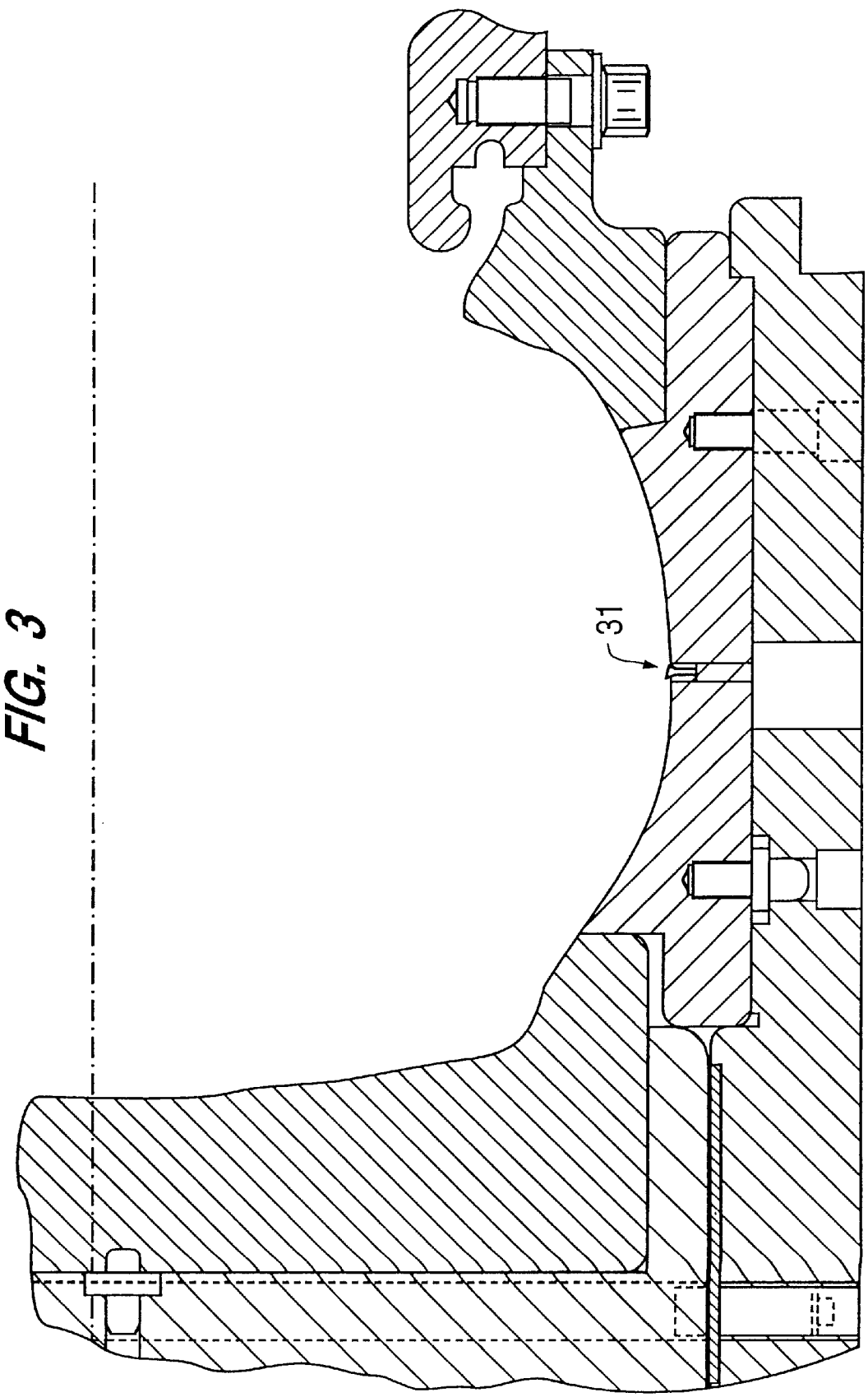
FIG. 3 shows in cross-section a bottom half of a tire mold with the insert vent of FIG. 1 positioned in the mid-sidewall region.
Figure 4A:
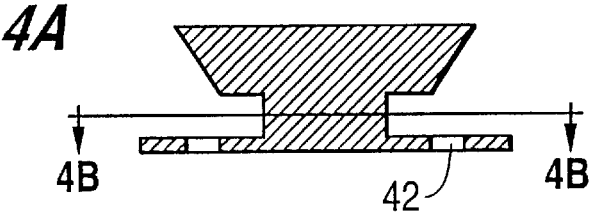
FIGS. 4A and 4B illustrate a further embodiment of the invention.
Figure 4B:
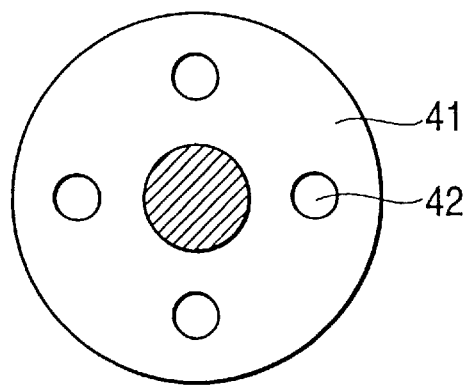
Figure 4C:
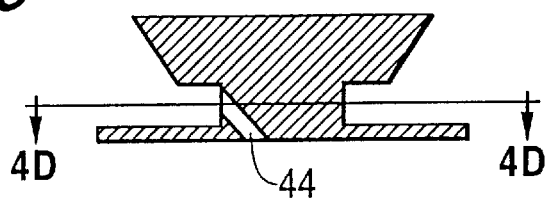
FIGS. 4C and 4D illustrate a further embodiment of the invention.
Figure 4D:
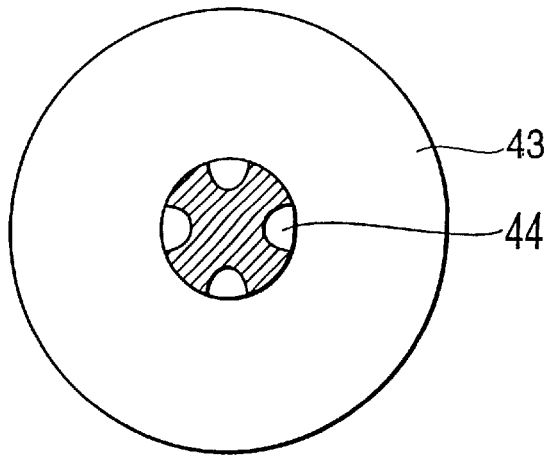

FIG. 3 shows the vent 31 of FIG. 1 inserted into the mid-sidewall region of a tire mold.

Figure 2A:
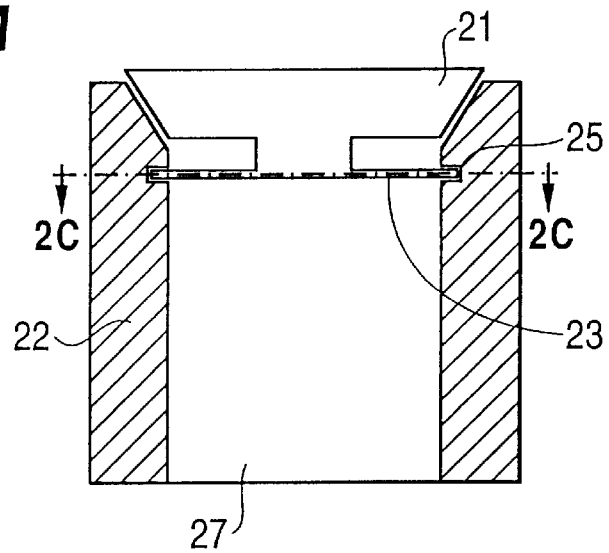
FIGS. 2A–2C show another insert vent according to the invention.
Figure 2B:
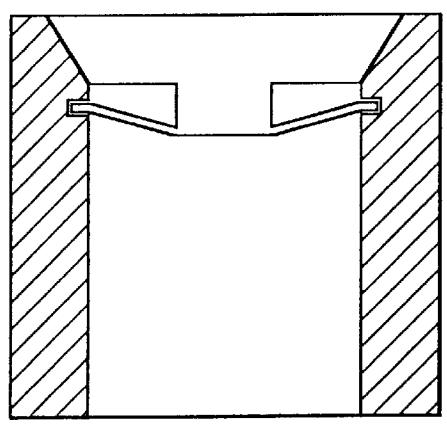
Figure 2C:
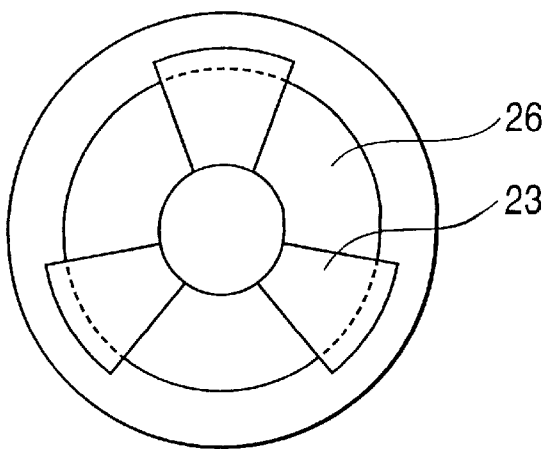

Shown in FIG. 2 is another embodiment of the present invention in which the spring opening means for opening the valve closure member 21 takes the form of integral spring legs 23. As shown in sectional diagram 2A of the vent in the open position these legs 23 are located in an internal groove 25 or grooves provided in the wall of the interior hole 27 in the vent main body 22. FIG. 2B is a sectional view taken in the plane 2C—2C of FIG. 2A and shows three such spring legs 23 equispaced within the interior of the main body 22 and spaced apart to provide passages 26 for the flow of air from the mold. As can be seen in FIG. 2B, the spring legs 23 bendingly deform when rubber presses on the valve closure member 21 to seal the valve. When the cured tire is removed from the mold, the spring legs 23 recover and push the valve closure member 21 outward thus opening the vent. Whilst in the second embodiment spring legs 23 are shown and described as being located in internal grooves 25 on the internal wall of the vent main body, they may also be formed integrally with the vent main body 22.

In alternative embodiments the spring legs may be replaced by a complete spring disc 41,43 as shown in FIG. 4. In this case holes 42,44 are provided either through the disc itself or through the closing member body as shown in FIGS. 4B and 4D which show sectional views taken in planes 4B—4B and 4D—4D of the closing members of FIGS. 4A and 4C respectively.

Also whilst all of the above described embodiments are shown as insert type vents, by which is meant they comprise a cylindrical main body which is inserted into a drilled hole in the mold wall, they are not necessarily restricted to this type of vent. Accordingly the valve closing member of each of the embodiments may be directly located into a hole provided in the mold wall. Thus in the case of the second embodiment and subsequent embodiments the spring legs or disc may be located directly into a hole in the mold either into grooves similar to those as shown or simply as an interference fit. In the case of the first embodiment the spring hinge 3 would be fixed by an appropriate method to the mold surface. In all cases the internal lip of the drill hole would preferably be profiled to match the shape of the valve closure surface to provide a good seal.

Having now described my invention what I claim is:

1. In a mold including a mold chamber defined by a mold wall, a vent for selectively communicating an interior of the mold chamber with an exterior thereof, the vent including:
   a bore formed in the mold wall so as to communicate an interior of the mold chamber with an exterior thereof; and
   a selectively movable closure member constructed and arranged on an interior side of the mold wall to selectively close off said bore, said closure member including at least one projection extending laterally therefrom, said at least one projection being unitary with said closure member and being fixed to a portion of the mold wall, wherein said at least one projection is resiliently biased so as to resiliently maintain said closure member in a position away from said bore so as to leave said bore opened.

2. The vent according to claim 1, wherein said at least one projection is unitary with said portion of the mold wall so as to be fixed thereto, whereby said closure member is hingedly attached to the mold wall.

3. The vent according to claim 1, wherein said closure member is constructed and arranged so as to lie flush with the interior surface of the mold wall when said closure member is positioned to close off said bore.

4. The vent according to claim 1, including a seating surface formed about said bore.

5. The vent according to claim 4, wherein said closure member includes a surface complimentary to said seating surface.

6. The vent according to claim 1, wherein said at least one projection is fixed to an interior of said bore between the interior and exterior sides of the mold wall.

7. The vent according to claim 6, wherein said interior of said bore includes a groove in which said at least one projection is received, whereby said at least one projection is fixed to the mold wall.

8. The vent according to claim 6, wherein said at least one projection is a leaf spring.

9. The vent according to claim 8, including a plurality of said projections spaced apart from one another about said closure member.

10. The vent according to claim 6, wherein said at least one projection is a resiliently flexible spring disc extending across said bore and having an opening formed therethrough.

11. An insert vent for a mold, comprising:
    a main body having a bore formed therethrough; and
    a selectively movable closure member constructed and arranged to selectively close off said bore, said closure member including at least one projection extending laterally therefrom, said at least one projection being unitary with said closure member and being fixed to a portion of said main body, wherein said at least one projection is resiliently biased so as to resiliently maintain said closure member in a position away from said bore so as to leave said bore opened.

12. The vent according to claim 11, wherein said at least one projection is unitary with said portion of said main body so as to be fixed thereto, whereby said closure member is hingedly attached to said main body.

13. The vent according to claim 11, wherein said closure member is constructed and arranged so as to lie flush with an end surface of said main body when said closure member is positioned to close off said bore.

14. The vent according to claim 11, wherein said main body includes a seating surface formed about said bore.

15. The vent according to claim 14, wherein said closure member includes a surface complimentary to said seating surface.

16. The vent according to claim 11, wherein said at least one projection is fixed to an interior of said bore intermediate respective ends of said main body.

17. The vent according to claim 16, wherein said interior of said bore includes a groove formed therein in which said at least one projection is received, whereby said at least one projection is fixed to said main body.

18. The vent according to claim 16, wherein said at least one projection is a leaf spring.

19. The vent according to claim 18, including a plurality of said projections spaced apart from one another about said closure member.

20. The vent according to claim 16, wherein said at least one projection is a resiliently flexible spring disc extending across said bore and having an opening formed therethrough.

21. A mold comprising:
- a mold chamber defined by a mold wall, the mold wall including an insert vent provided in a bore formed in the mold wall;
- said insert vent comprising:
    - a main body having a bore formed therethrough; and
    - a selectively movable closure member constructed and arranged to selectively close off said bore, said closure member including at least one projection extending laterally therefrom, said at least one projection being unitary with said closure member and being fixed to a portion of said main body, wherein said at least one projection is resiliently biased so as to resiliently maintain said closure member in a position away from said bore so as to leave said bore opened.

22. The mold according to claim 21 wherein said closure member is unitary with said main body, whereby said closure member is hingedly attached to said main body.

23. The mold according to claim 21, wherein said closure member is constructed and arranged so as to lie flush with an end surface of said main body when said closure member is positioned to close off said bore.

24. The mold according to claim 21, wherein said main body includes a seating surface formed about said bore.

25. The mold according to claim 24, wherein said closure member includes a surface complimentary to said seating surface.

26. The mold according to claim 21, wherein said at least one projection is fixed to an interior of said bore intermediate respective ends of said main body.

27. The mold according to claim 26, wherein said interior of said bore includes a groove formed therein in which said at least one projection is received, whereby said at least one projection is fixed to said main body.

28. The mold according to claim 26, wherein said at least one projection is a leaf spring.

29. The mold according to claim 28, including a plurality of said projections spaced apart from one another about said closure member.

30. The mold according to claim 26, wherein said at least one projection is a resiliently flexible spring disc extending across said bore and having an opening formed therethrough.

* * * * *